UNITED STATES PATENT OFFICE.

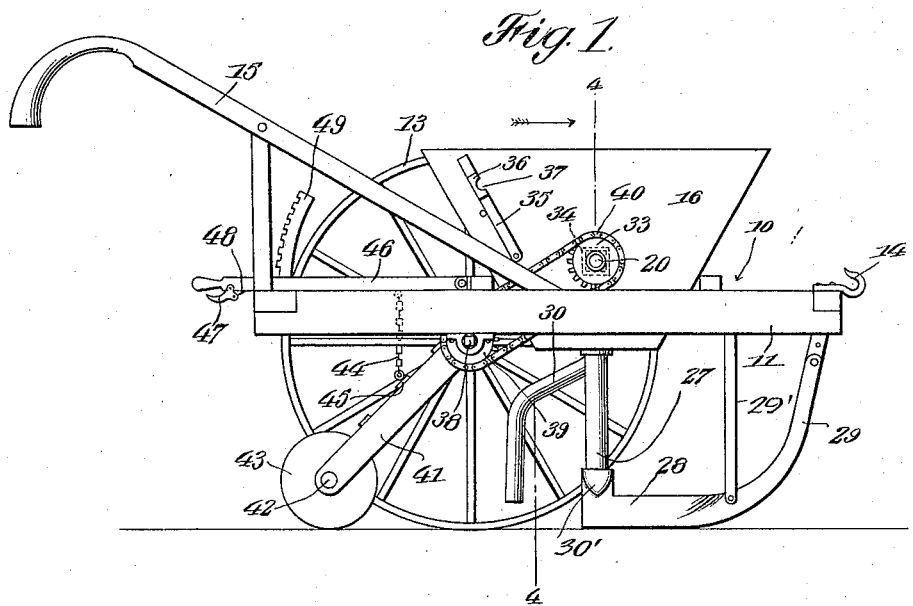

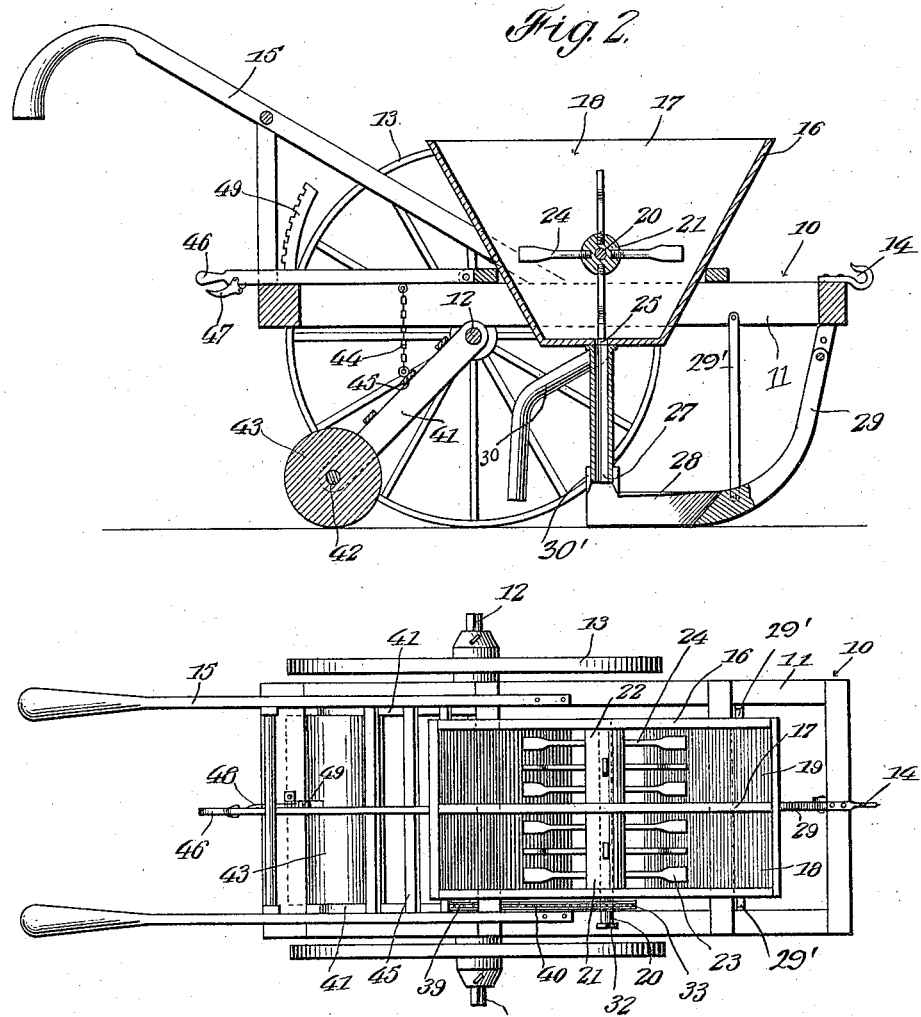

CHARLES FENNEL, OF HUNTSVILLE, ALABAMA, ASSIGNOR OF ONE-HALF TO ANDREW COWAN, OF HUNTSVILLE, ALABAMA.

COMBINED PLANTING AND FERTILIZER-DISTRIBUTER MACHINE.

1,178,506.  Specification of Letters Patent.  Patented Apr. 11, 1916.

Application filed February 7, 1912. Serial No. 676,000.

*To all whom it may concern:*

Be it known that I, CHARLES FENNEL, a citizen of the United States, residing at Huntsville, in the county of Madison and State of Alabama, have invented new and useful Improvements in Combined Planting and Fertilizer-Distributer Machines, of which the following is a specification.

An object of the invention is to provide a combined planting and fertilizer distributing machine for sowing seed and then covering the same with a fertilizer.

The invention embodies, among other features, a machine adapted to operate over the ground to create a furrow into which the seeds are dropped, being then adapted to cover the seeds with fertilizer after which a roller, forming a part of the machine passing over the furrow presses the ground around the seeds.

For the purpose mentioned, use is made of a frame, a hopper mounted on the frame and provided with a partition forming compartments therein, one of the compartments being adapted to contain the seeds and the other being adapted to contain the fertilizer, a plow mounted on the frame and adapted to create a furrow when the frame is operated over the ground, means operable in the hopper to agitate the seed and the fertilizer so that the same will pass into the furrow and a roller adapted to operate over the furrow and press the ground around the seeds.

Reference is to be had to the accompanying drawings constituting a part of this specification, in which similar characters of reference denote corresponding parts in all the views, and in which—

Figure 1 is a side elevation of my device. Fig. 2 is a vertical longitudinal sectional view of the machine as disclosed in Fig. 3. Fig. 3 is a plan view. Fig. 4 is a vertical transverse sectional view taken on the line 4—4 in Fig. 1, looking in the direction of the arrow. Fig. 5 is a perspective view of a locking bar forming a part of my device. Fig. 6 is an end view of one of the toothed wheels, showing the squared shank thereof.

Referring more particularly to the drawings, I provide a frame 10, consisting of side bars 11 provided with an axle 12 having wheels 13 keyed thereto, a hook 14 being secured to the front of the frame 11 for attaching suitable draft animals thereto and handles 15 being extended rearwardly from the frame for the purpose of permitting the operator to guide the frame 10 in its movement over the ground.

Rigidly mounted on the side bars 11 is a hopper 16 having a vertical longitudinally extending partition 17, forming compartments 18, 19 in the hopper 16, the compartment 18 being adapted to contain seed and the compartment 19 being adapted to contain fertilizer. Extending horizontally through the hopper 16 is a shaft 20 having hubs 21, 22 keyed thereto and rotatable therewith, suitable paddles 23, 24 being secured to the hubs 21, 22 respectively and rotatable therewith to agitate the contents of the compartments 18, 19. By referring to Fig. 2 it will be seen that the paddles 23, 24 are arranged differently on the hubs 21, 22 respectively for the purpose of facilitating the agitation of the materials contained in the compartments of the hopper. Openings 25, 26 are provided in the bottoms of the compartments 18, 19 and secured to the under side of the hopper 16, to register with the opening 25, is a discharge pipe 27 terminating in a flared plow or furrow opener 28, the flared sides of the plow being adapted to converge at their forward ends and form a curved bar 29 connected to the front end of the frame 11, (the said bar 29 being braced to the side bars 11 by means of upwardly diverging braces 29'. Formed on the free terminal of the bar 29 is an upstanding socket 30' adapted to receive the lowermost end of the discharge pipe 27.) Secured to the under side of the hopper 16 and registering with the opening 26 is a discharge pipe 30 arranged to permit the discharge of the contents of the compartment 19, the mentioned discharge pipe 30 being bent so that the discharge end thereof will be located immediately in the rear of the discharge pipe 27 and in horizontal longitudinal alinement therewith.

One end of the shaft 20 extends outwardly a distance beyond the hopper 16 and is provided with a squared portion 31, a nut 32 being secured to the end of the shaft to retain thereon a toothed wheel 33 provided with an integral squared shank 34. The toothed wheel 33 is loosely mounted on the exterior end of the shaft 20 and the squared shank of the toothed wheel is adapted to fit over the squared portion 31 of the shaft, thus causing the shaft to rotate with the wheel. When it is desired to retain the shaft 20 in stationary position, thus preventing the paddles 23, 24 from revolving within the compartments 18, 19, the squared shank 34 of the toothed wheel 23 is disengaged from the squared portion 31 of the shaft 20 and a locking bar 35, pivotally mounted on a side of the hopper 16 and provided with a squared offset portion 36 and a semi-circular cutout portion 37, is swung downwardly so that the squared offset portion 36 thereof will fit over the squared portion 31 of the shaft 20, thus locking the shaft 20 in stationary position, while the toothed wheel 33, loosely mounted on the shaft 20 will continue to revolve without imparting a rotative movement to the shaft.

The axle 12 is provided with a squared portion 38 to which is rigidly secured a toothed wheel 39 and a chain 40 is passed over the toothed wheel 33 and the toothed wheel 39, thus causing the toothed wheel 33 to revolve when the axle 12 is revolved, the mentioned axle 12 being revoluble with the wheels 13. Mounted between the wheels 13 and journaled on rounded portions of the axle 12 are hangers 41 having a shaft 42 journaled in the lower ends thereof, a roller 43 being keyed to the said shaft, the said roller being adapted to normally operate over the ground. A chain 44 is connected to a bar 45 secured to the hangers 41 and the other end of the chain is secured to a lever 46, pivotally mounted on the frame 11, the said lever being provided with a locking lever 47 adapted to actuate a locking rod 48, operable over a rack 49 secured to the side bars 11.

In the use of my device, assuming that the compartment 18 is filled with seed and the compartment 19 is filled with a fertilizer, when the frame 10 is operated over the ground, the plow 28 will create a furrow and the toothed wheel 33 being connected with the shaft 20 to rotate the same will cause the paddles 23, 24 to rotate, thus agitating the contents of the compartments 18, 19 so that the seed in the compartment 18 will pass through the opening 25 and drop into the furrow formed by the plow, the fertilizer contained in the compartment 19 being adapted to pass through the discharge pipe 30, in the rear of the discharge pipe 27 and drop into the furrow to cover the seed. Now as the frame moves along, the ground which has been raised by the plow in creating the furrow, will gravitationally fall back into the furrow and the roller 43 passing over the ground will press the same in the furrow and pack the ground closely around the seeds and fertilizer. Should it be found necessary to dispense with the use of the roller 43, the locking rod 48 is disengaged from the rack 49 by actuating the locking lever 47 and then by raising the lever 46, the roller 43 will be raised from the ground, after which the locking rod 48 is permitted to reëngage the rack 49, thus retaining the roller in spaced relation to the ground, as will be readily understood. By disengaging the squared shank 34 of the toothed wheel 33 from the squared portion 31 of the shaft 20 and swinging the locking lever 35 into position to lock the shaft 20, the paddles 23 and 24 will be prevented from rotating in the compartments 18, 19 as has been heretofore described.

From the foregoing description it will be seen that a device is provided, which in its operation over the ground, first creates a furrow into which the seed and fertilizer are permitted to pass and the ground that has been raised in producing the furrow is then repacked by the roller 43, the entire operation of creating the furrow, agitating the seed and fertilizer to permit the same to pass into the furrow and the action of the roller in compressing the ground, raised in forming the furrow being coincident with the operation of the frame over the ground.

I claim:

A combined planting and fertilizer distributer comprising a frame, an axle, wheels mounted upon the axle, a hopper thereon, a shaft journaled in the hopper and having one end projecting beyond one of the side faces thereof and provided with a squared portion, paddles mounted to rotate with the shaft, a toothed wheel mounted upon the squared portion of the shaft, means on the free end of the projecting portion of the shaft for preventing any accidental displacement of said toothed wheel therefrom, another toothed wheel on said axle, a chain passing over both toothed wheels for imparting movement to the paddles upon the progressive movement of said distributer, and a bar pivotally mounted on the hopper and formed with a squared offset portion formed with a semi-circular cut-out portion, the squared portion of said bar fitting over the squared portion of the shaft upon the displacement of the first mentioned toothed wheel from the squared portion of the shaft and adapted to lock the paddles against movement upon further progressive movement of the distributer.

In testimony whereof I affix my signature in presence of two witnesses.

CHAS. $\overset{his}{\times}$ FENNEL.
mark.

Witnesses:
L. L. WIKLE,
T. M. STUART.